US007457902B2

(12) United States Patent
Yang et al.

(10) Patent No.: US 7,457,902 B2
(45) Date of Patent: Nov. 25, 2008

(54) LOCK AND RELEASE MECHANISM FOR OUT-OF-ORDER FRAME PREVENTION AND SUPPORT OF NATIVE COMMAND QUEUEING IN FC-SATA

(75) Inventors: Kent YingKuang Yang, Costa Mesa, CA (US); William Patrick Goodwin, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 308 days.

(21) Appl. No.: 11/490,647

(22) Filed: Jul. 21, 2006

(65) Prior Publication Data

US 2008/0022026 A1 Jan. 24, 2008

(51) Int. Cl.
*G06F 12/14* (2006.01)
(52) U.S. Cl. ........................ 710/200; 710/36
(58) Field of Classification Search ................ 710/200, 710/305–306, 316–317, 107–109, 36
See application file for complete search history.

(56) References Cited

U.S. PATENT DOCUMENTS

| 6,532,547 | B1 * | 3/2003 | Wilcox ........................... 714/5 |
| 6,915,363 | B2 * | 7/2005 | Wood et al. ..................... 710/74 |
| 6,993,027 | B1 * | 1/2006 | Kadambi et al. ............. 370/394 |
| 7,145,869 | B1 * | 12/2006 | Kadambi et al. ............. 370/229 |
| 7,356,638 | B2 * | 4/2008 | Holland et al. ............... 710/316 |
| 2006/0075165 | A1 * | 4/2006 | Hui et al. ....................... 710/58 |

* cited by examiner

*Primary Examiner*—Raymond N Phan
(74) *Attorney, Agent, or Firm*—Morrison & Foerster LLP

(57) ABSTRACT

A switch connection lock and release mechanism is disclosed to prevent out-of-order frames from being received by FC and/or SATA devices. The mechanism includes a set of previous AL_PA registers, alpa_reg[N:0], one for each port, and a bit vector, prev_conn[M:0], one bit for each Buffer Bank (BB). If a connection is closed prematurely, the valid AL_PA of the destination device and the source port number are stored in the previous AL_PA register associated with the destination port, and the bit in the bit vector associated with the source BB is asserted. Together, the valid AL_PA, the source port and the asserted bit form a connection lock on the destination port that effectively will deny access to the destination port to all BBs with the same destination AL_PA and source port number except the source BB.

34 Claims, 11 Drawing Sheets

LOCK AND RELEASE MECHANISM FOR OUT-OF-ORDER FRAME PREVENTION AND SUPPORT OF NATIVE COMMAND QUEUEING IN FC-SATA

FIELD OF THE INVENTION

This invention relates to preventing Out Of Order (OOO) frames from being received by Fibre Channel (FC) and/or Serial Advanced Technology Attachment (SATA) devices, and more particularly, to a switch connection lock and release mechanism that prevents OOO frames from being received by FC and/or SATA devices and supports Native Command Queueing (NCQ) of multiple commands over a single connection to a SATA destination or target device.

BACKGROUND OF THE INVENTION

Conventional FC SANs. Fibre Channel (FC) is a serial transport protocol that was developed for carrying other transport protocols. In conventional Storage Area Networks (SANs), FC carries Small Computer System Interconnect (SCSI), which is a parallel protocol. In other words, parallel SCSI commands are encapsulated within FC frames and transported over FC links in FC SANs.

FIG. 1 illustrates an exemplary conventional SAN 100 which includes one or more hosts 102 connected to two Redundant Array of Independent Disks (RAID) controllers 104 over a network 106. The host side of the RAID controllers 104 is referred to as the "front end" 112. In conventional SANs 100, the RAID controllers 104 are connected to a plurality (e.g. 30 to 100) of drives in disk drive enclosures 108 and send and receive FC frames over a FC link 110. The disk drive enclosure side of the RAID controllers 104 is referred to as the "back end" 114. In conventional SANs 100, the disk drives within the disk drive enclosures are FC drives 118 that operate according to the SCSI protocol.

FC-ATA SANs. FC drives offer the best performance, but are expensive. Therefore, less expensive (but lower performance) Advanced Technology Attachment (ATA) drives of the type commonly used in desktop or notebook computers have been used in place of FC drives, or along with FC drives in what is referred to as tiered storage. The ATA drives may be Parallel Advanced Technology Attachment (PATA) or Serial Advanced Technology Attachment (SATA) drives. FIG. 1 illustrates a SAN in which one of the disk drive enclosures 108 contain PATA drives 120 rather than FC drives. PATA drives require a FC-to-PATA bridge 116, which is relatively expensive and effectively makes the PATA disk drives 120 appear as SCSI drives to the RAID controller 104. In other words, the RAID controllers 104 send FC encapsulated SCSI commands to the disk drive enclosures, and receive FC encapsulated SCSI commands from the disk drive enclosures, and the conversion between FC and PATA occurs in the bridge 116, transparent to the RAID controllers 104 and the rest of the SAN 100. Because PATA drives are different from FC drives in terms of interfaces, error recovery and discovery, FC-to-PATA bridges are designed to be specific to a particular type of PATA drive. As a consequence, every time a new PATA drive is developed, the FC-to-PATA bridge may require modification.

In disk drive technology, as well as in transport technology, there are speed and cable distance benefits to utilizing serial protocols rather than parallel protocols. SATA drives, the serial counterpart to PATA drives, are therefore now being contemplated as an upgrade to PATA. SATA was envisioned for consumer applications.

SAS-SATA SANs. FC, as described above, is a serial transport protocol that has historically been used for carrying the SCSI protocol in enterprise applications over large connectivity spaces. Serial Attached SCSI (SAS) is a relatively new serial protocol intended to replace parallel SCSI within an enterprise host or computer. Both FC and SAS use 8b10b encoding and similar ordered sets, and both are high performance and expensive. SAS includes several protocols. One such protocol is the Simple Management Protocol (SMP), a protocol for device-to-device management that enables each entity to communicate with other entities regarding management aspects.

To take advantage of lower cost SATA drives, SATA drives have been utilized alongside higher cost, higher performance SAS drives in SAS networks (a SAS network including the initiator, target, and any attached expander devices). As mentioned above, tiered storage is the concept of having different types of drives in the same network (e.g. some 73 GByte FC drives and some 200-500 GByte SATA drives), each for a different purpose. FIG. 2 illustrates a SAS SAN incorporating tiered storage, where SATA drives are utilized in addition to SAS drives. As illustrated in FIG. 2, within a host 200, a motherboard (MB) 202 includes a processor 204, an embedded SAS Input/Output Controller (IOC) 206, and a SAS expander 208 to provide multiple ports to the MB 202 and multiple connections to drives. Connected to the host 200 are SAS drives 210 and SATA drives 212 within the host 200. In addition, the host 200 is connected to enclosures 214 containing both SAS and SATA drives. To accommodate tiered storage, another protocol was developed within SAS, the SATA Tunneling Protocol (STP), which enables lower cost SATA drives to be employed in SAS systems.

Unlike FC, which is a loop technology where drives share a common infrastructure, SAS is a point-to-point technology. SAS employs a shared infrastructure with the ability to create a point-to-point connection between two devices through which data may be transferred without interruption. Similar to FC, SAS goes through a discovery process where the first SAS entity that is discovered is the SAS expander 208. The number of ports in the SAS expander 208 is also discovered. Each port is then discovered in turn by the initiator, and the device connected to each port is determined (e.g. a SAS device). For example, if a SAS discovery ordered set is sent to a SAS drive, the SAS drive returns an affirmative response indicating that it is a SAS drive. However, if the SAS ordered set is sent to a SATA drive, nothing is returned. Similarly, if a SATA discovery ordered set is sent to a SATA drive, the SATA drive returns an affirmative response, indicating that it is a SATA drive. From that point forward, the initiator communicates with the device as a SATA device.

In the simplified ladder diagram of FIG. 2 showing a half-duplex operation, SAS ordered sets are sent between the initiator 200 and the enclosure expander. The enclosure expander makes a connection between the initiator 200 and the correct target. Once the connection is created, SATA ordered sets 216 flow between a host or initiator 200 and a target 218. The SAS communications effectively build a point-to-point connection between the SAS IOC 206 and a target (e.g. SATA drive 212), and thereafter SATA ordered sets are passed across this connection that are natively understood by the SATA drive 212. Intermixed with the SATA ordered sets will be SATA File Information Structures (FISs) flowing from the initiator 200 to the target 218 (see reference character 220), and from the target 218 to the initiator 200 (see reference character 222) according to STP.

Because of the reliability, speed and cable distance benefits inherent in FC, and the lower cost of SATA drives, there was a need to utilize SATA drives in FC SANs that have historically utilized SCSI drives. Conventional solutions for utilizing SATA drives in FC SANs provided a conversion interface, or bridge, between the FC link and the SATA device. These conversion interfaces terminated all FC exchanges and initiated corresponding SATA exchanges at or near the targets. These bridging solutions required a bridge unit per SATA device or a bridge per SATA enclosure and as a result became a prohibitively expensive solution in a SAN environment. In addition, all error cases were dealt with at or near the drive level. In the other direction, SATA exchanges were also terminated and FC exchanges are created and sent to the FC initiator. Because the FC to SATA translation was performed independently at each SATA drive or enclosure, there was no clean way of performing this conversion and the approach was prone to performance and interoperability issues. Error recovery in FC is also much different than SATA. The interface had to deal with the differences, which added complexity and additional cost to the system.

Therefore, there was a need to be able to utilize SATA drives while preserving the FC infrastructure and FC transport to the greatest extent possible to minimize the changes needed to legacy FC SANs. There was a further need to move the translation and protocol handling into the RAID controllers, which is a much more cost effective solution because the RAID controllers can perform the protocol translation for a large number of drives.

FC-SATA SANs. FIG. 3 illustrates a SAN 300 including SATA drives and a conversion from FC to SATA that satisfied the needs described above. Such a system is described in further detail in U.S. patent application Ser. No. 11/104,341, filed on Apr. 11, 2005 and entitled "Method and Apparatus for SATA Tunneling Over Fibre Channel," the contents of which are incorporated herein by reference. In particular, FIG. 3 illustrates a system that encapsulates Serial Advanced Technology Attachment (SATA) Frame Information Structures (FISs) into Fibre Channel (FC) frames for transmission over FC SANs that utilize SATA disk drives.

When SCSI commands are to be sent from host 330 to SATA drives 342 in disk drive enclosure 332, a FC HBA 334 in host 330 sends FC frames encapsulating the SCSI commands out over the fabric 318 to a RAID controller 320, where they are received in one of the ports 336 on the RAID controller 320. Note that the ports 336 may also be connected to other hosts in the SAN 300. Note also that a RAID controller need not be employed, but rather any device providing an IOC function may be utilized. The FC frames are then routed to FC IOCs 322 in the RAID controller 320. The SCSI commands within the FC frames are then de-encapsulated by the FC IOCs 322 and passed over a Peripheral Component Interconnect (PCI) bus 324 to a processor 326, which performs the RAID function and creates multiple commands to satisfy the received SCSI command. The created commands may be SCSI commands or SATA commands and will be sent to one or more disk drives within enclosures 332.

The SCSI commands 306 are then passed from the processor 326 over a custom interface 328 (which may include, but is not limited to a PCI bus) to Fibre Channel Attached SATA Tunneling (FAST) enabled IOCs 304. The FAST IOCs 304 contain the same hardware as conventional FC IOCs, but include additional firmware 302 to allow it to handle both FC and SATA. SCSI commands 306 from processor 326 are converted in SCSI-to-SATA translation firmware 308 to SATA FISs. Alternatively, the SCSI-to-SATA translation may be performed by the processor 326 rather than in the FAST IOC 304. The SATA FISs are then encapsulated by FAST encapsulation firmware 312 into FC frames. In particular, each 8 kByte SATA FIS is encapsulated into four 2 kByte FC frames along with modifications to the header in the FC frames that enable the SATA-encapsulated FC frames to traverse a FC link. The FAST IOC 304 then sends the FC frames out over a FC link 346 via a FC port 344.

The FC frames are received by FAST switches 340 in disk drive enclosures 332, which are utilized instead of FC-to-SATA bridges. Because FC-to-SATA bridges are no longer required, the problem of new SATA drive types requiring reworking the FC-to-SATA bridge disappears. The drives can be presented as pure ATA throughout the SAN, while using FC as the transport. The FAST switches 340 include a FAST engine 352, which de-encapsulates the FC frames to retrieve the SATA FISs, handles initialization, sequences, exchanges, and all of the low-level FC commands and structures. Note that conventional FC switches only route frames between the initiator and target (which handle all exchanges themselves). However, because SATA drives do not utilize the concept of exchanges, the FAST switches are responsible for creating and terminating exchanges. The de-encapsulated SATA FISs are then communicated over a pure SATA connection 348 to the SATA drives 342.

Note that the front end devices 350 and the SAN 300 are not aware of the existence of the back end devices 338. For example, when host 330 sends SCSI data to a particular logical drive, it acts as a front-end initiator and sends the FC-encapsulated SCSI data to a virtual address associated with one of the ports 336 and a FC IOC controller 322 connected to that port 336, which acts as a front-end target. Unknown to the host 330, the processor 326 performing the RAID function identifies multiple addresses in multiple disk drive enclosures 332, and sends the SCSI data to one or more FAST IOCs 304, which act as back-end initiators. The FAST IOCs 304 translate the SCSI data into SATA FISs, encapsulate the SATA FISs into FC frames, and send the FC frames to those multiple addresses in multiple disk drive enclosures 332, which act as back-end targets. This process is referred to as virtualizing the storage. The processor 326 maintains the association between the virtual address and the addresses in the multiple disk drive enclosures, so that when a request to read that data is received from the host 330, the data can be pulled out of the multiple disk drive enclosures and sent back to the host 330.

The reverse of the above-described process is employed when a SATA drive 342 sends SATA FISs back to the host 330. Thus, when SATA FISs are to be sent from a SATA drive 342 to the RAID controller 320, the SATA FISs are sent over the SATA connection 348 to the FAST switch 340, where it is encapsulated in FC frames. The FAST switch 340 then transmits the FC frames over the FC link 346 to the RAID controller 320, where they are received by the FAST IOC 304. The FAST IOC 304 receives the FC frames, de-encapsulates the frames to retrieve the SATA FISs, and performs a SATA to SCSI translation 308 so that the RAID controller will see the target drive 342 as a SCSI device. The SCSI commands are sent to the processor 326 over PCI bus 328, which performs the RAID function and identifies the hosts (initiators) for which the SCSI data is destined. The SCSI data is then sent to the FC IOCs 322 over PCI bus 324, where they are encapsulated into FC frames and sent to the appropriate hosts over the fabric 318. The hosts then de-encapsulate the FC frames to retrieve the SCSI commands.

The benefit of performing the encapsulation/de-encapsulation and the SATA/SCSI translation in the FAST IOC 304 is that other than the addition of the FAST IOC 304, legacy RAID controllers 320 need not be changed to support SATA commands. Because FC is a mature interconnection technology, the FC link 346 is retained between the RAID controller 320 and the multiple disk drive enclosures 332, even though the FC frames are now encapsulating SATA FISs. The conversion from SCSI to SATA could occur in the FAST IOCs 304 or in the processor 326. In either case, the FAST IOCs 304 would then communicate SATA FISs to the disk drive enclosures 332 over a pure FC connection. In general, the SCSI/SATA translation and FAST encapsulation could occur anywhere on the initiator side of a FC link, while the FAST de-encapsulation/encapsulation could occur anywhere on the target side of the FC link.

A primary difference between SAS-SATA SANs described above and the system of FIG. 3 is that in SAS-SATA SANs, there is a mixture of SATA FISs and SAS in the interconnect, while in FIG. 3, everything in the interconnect is FC. There are no SATA FISs, just FC frames with SATA FISs encapsulated within them.

Alternatively, a host may encapsulate SATA FISs in FC frames and pass these frames to a RAID controller, where the SATA FISs may either be de-encapsulated, virtualized and re-encapsulated into FC frames destined for multiple SATA drives in the back end, or simply passed through the RAID controller and sent directly to SATA drives through the FC network.

The FAST switch. FIG. 4 illustrates an exemplary FAST switch 400 resident in a FAST disk drive enclosure (not shown). The FAST switch 400 contains a number of FC Phy 402 and FC link layers 404 for interfacing with the FC ports on one or more RAID controllers over a FC link 404. The FC Phy 402 and FC link layers 404 handle all the primitives in FC. These layers monitor received FC primitives, modifying the active switch matrix connections in response to traffic going across the FC link. The FC link layers 404 are connected to a crossbar switch 406, which is also connected to a number of port link layers 408 for connecting to either a FC device or a SATA device. The crossbar switch 406 operates in FC Arbitrated Loop (FC_AL) space, and performs a switching function. It uses the FC Arbitrated Loop Physical Address (AL_PA) and OPeN (OPN) ordered sets to determine the destination of a connection request, and makes a connection across the crossbar switch to the target device.

Each port link layer 408 includes a FC/SATA link layer 410, a FC Tunneling SATA (FTS) layer 412, and a FC/SATA Phy 414. The FTS layer 412 contains logic which detects whether the port link layer 408 is connected to a SATA drive by detecting SATA ordered sets, and determines the status of the SATA drive. The FC/SATA Phy 414 are connected to SATA or FC drives 416.

Also connected to the crossbar switch 406 are FAST port/buffers 418 coupled to the crossbar switch 406 and one or more (e.g. four) FAST engines 420. The FAST engine 420 contains a full SATA core (and a Register Transfer Level (RTL) state machine) that understands the lower levels of the SATA protocol. The FAST engines 420 are viewed as initiators to the SATA drives 416. Note that because it would take up too much space to have a FAST engine and buffers for each port, a reduced number of FAST engines and buffers are shared between the port link layers 408. A small Ordered Set (OS) generation and detection circuit in the FC link layer 404 is used to keep the SATA drive interface serviced. The OS generator sends ALIGN characters to the SATA drive when not connected to the SATA link-layer in one of the FAST engine blocks. The detection circuit determines when the SATA drive is making a request that requires servicing by the SATA link-layer block in the FAST engine and passes the request to the router 422 to request a connection. The router 422 is connected to the crossbar switch 406 and makes routing decisions within the crossbar switch 406. Also connected to the crossbar switch 406 is an enclosure management function 424 controllable by a Central Processing Unit (CPU) port 426. The CPU port is a path to allow a processor to monitor FC frames locally.

To handle the FC protocol for the SATA targets, the FAST switch will take a FC address for each SATA device connected to a port (this would be an AL_PA for FC_AL topologies and a Destination IDentifier (D_ID) for Fabric or Point-point topologies) during the initialization sequence. The FAST engine will also respond to all Port LOGIns (PLOGIs) and PRocess LogIns (PRLIs) and will generate a Fabric LOGIn (FLOGI) if a fabric is present. The FAST engine knows from the presence of AL_PA 00 that a fabric is present. The logins will identify the targets as SATA devices. This allows a tunneling capable initiator to discover the devices and initiate a SATA connection to them. All non-ATA commands will be directed to the CPU port for analysis and response. Using the CPU port to process the FC login commands allows the flexibility of firmware to handle error and out of bound conditions.

The FAST port/buffers 418 are notified by the FAST engine 420 that there is an active SATA drive attached, and perform several functions. During FC loop initialization, the FAST port/buffers 418 take an AL_PA to reserve an address in the FC_AL subsystem. The FAST port/buffers 418 act as a FC target and receive FC primitives, OPNs, ARBitrates (ARBs), IDLEs, Loop Initialization Primitives (LIPs) and frames, and generate and send OPNs, ARBs, LIPs, and frames back to the initiator to make it appear to the FC port like a virtual disk drive. The FAST port/buffers 418 also terminate all FC frames coming across the FC link, handle all the FC protocols, and put the data into a First In First Out (FIFO) buffer for subsequent processing by the FAST engine 420. The FAST port/buffers 418 can also be statically configured by setting a bit to support either standard FC or SATA-encapsulated FC frames, and thus can be connected to either FC or SATA drives. The FAST port/buffers 418 also have buffers to translate from FC speeds to SATA speeds and perform speed matching with the drives.

SATA supports up to an 8k frame size. In order to transfer the SATA frames through FC environment, the SATA frames must be divided into the negotiated FC frame size. This is accomplished by filling a FC buffer in the FAST port/buffers 418 and then sending a HOLD to the SATA target until another FC buffer is available. When the FC buffer is available, the HOLD is released and additional data is received from the SATA device. This facility requires that the FAST switch increment the SEQuence IDentifier (SEQ_ID) on each frame of a response to detect out of order and lost frame tracking by the initiator. When data is being received on the FC side destined for the SATA device, the data will come in as the negotiated frame size where it will be assembled into the proper SATA frame sizes. If the entire SATA frame is not available to send to the target, a HOLD is sent to the target until the next frame is received from FC interface or the last sequence of the exchange is received.

The FAST engines 420 emulate the host initiator to the SATA drive 416, and take the data out of the FIFO buffer (in the case of data going from the initiator to the SATA drive). The FAST engines 420 also check incoming frames to determine if they are valid SATA frames to be passed on to the SATA drive 416, if it is a PLOGI frame that needs to be responded to (low level responses) without involvement of the driver, or if it is a frame that the FAST engine does not recognize and must send to the CPU port for the processor to handle on an exception basis.

When a SATA drive 416 is ready to transfer data, the SATA drive sends a Transmit (Tx) Receiver ReaDY (R_RDY) ordered set to the port link layer 408, indicating that data is ready to be transferred. However, if the FAST switch is not ready to receive the data because no FAST engine 420 is available, for example, the FTS 412 detects this condition and continues to send an idle character to the SATA drive, which will not start sending data until R_RDY ordered sets are sent, signaling it is okay to start transmitting data back to the FAST switch. When a FAST engine 420 becomes available, the FTS 412 sends a routing request to the router 422 (who knows from the discovery process that the requestor is a SATA drive 416), requesting that the SATA drive be connected to a FAST engine 420. When a FAST engine 420 is assigned, the FAST engine becomes the initiator to the SATA drive (the target). Because SATA is a point-to-point protocol, SATA believes there is only the initiator and the target, nothing else. In effect, there is no addressing, because none is needed.

Affiliations. SATA targets are designed to be controlled by a single initiator. In order to use these devices in a multi-initiator environment, an affiliation method is deployed. The affiliation method provides a reserve and release control mechanism to ensure non-queueable commands from multiple initiators do not collide. Prior to issuing a non-queueable command, an initiator must request and be granted an affiliation with the desired SATA target. Only after being granted an affiliation may an initiator issue a non-queueable command to a SATA drive.

Affiliations can be used in loop and fabric environments. The initiator first sends an affiliation frame to the target. The FAST switch receives this frame and, assuming the disk is available, generates a response frame for granting the affiliation to the initiator. If the disk is unavailable, either by being already in an affiliation or processing queueable commands, the FAST switch may queue up the affiliation request, to be processed when the disk is available, or may immediately generate an affiliation not available response.

Once the point-to-point connection is made, the FAST engine 420 is responsible for accepting the responses from the SATA drive 416, performing all the handshaking with the SATA drive, encapsulating the received data (e.g. data in response to a read request) into FC frames along with the proper context for the response, and storing the encapsulated FC frames into the FAST port/buffers 418. The FAST engine 420 tracks that the request came in from a particular device with a particular OXID, Source Identifier (S_ID) and D_ID. The FAST engine 420 utilizes this context information to build FC frames, move completed FC frames (having the SATA FIS encapsulated within) to the FAST port/buffers 418 and ensure that the response is sent to the right place, using the correct exchange, and in the proper sequence. The SATA core in the FAST engine 420 is also responsible for telling the drive 416 to hold off if the FAST port/buffers 418 are full.

When multiple FC frames have been built and stored in the FAST port/buffers 418, and either all buffers are full or the SATA response is complete and a complete exchange is stored, the buffer state machine makes a routing request to the router 422, who has access to the context of the response and knows who the initiator is, to route the FC frames out of a FC Phy 402 connected to the initiator.

The FAST engines are also used in a similar manner to fill the frames for write commands to the SATA drives.

When the current initiator is finished sending requests, a close affiliation frame is sent to the FAST switch, which removes the affiliation at the completion of all pending I/Os. The tunnel device then sends an affiliation removal accept following the completion of the last outstanding I/O. Affiliations may also be closed by the FAST switch, to facilitate fairness between the multiple initiators. To close and affiliation, the FAST switch generates an affiliation close frame to the initiator if it desires to close the affiliation and allow another initiator access to the target. Upon receipt of the affiliation close, the initiator normally stops sending I/O requests and forwards an affiliation close accept frame. The initiator could reject the affiliation close request from the switch, keeping the affiliation active if the initiator so desires.

In a private environment the affiliations are handled automatically. In this configuration, the first initiator to send an I/O request receives the affiliation. This affiliation is kept open for as long as the initiator has outstanding I/Os to the target, or has expired the associated timer. Upon completion of the last outstanding I/O, the affiliation is automatically closed. The initiator can close an affiliation by not sending additional I/Os to the target and allow the outstanding I/Os to complete. If a second initiator sends an open to the target, the target will respond with a close. The FAST engine may place the AL_PA of the initiator into the requestor stack and when an affiliation is available, sends a full duplex open to the initiator. An affiliation close frame is still used to allow the target to break an affiliation. In this case, the target generates an affiliation close frame to the initiator if it desires to close the affiliation and allow another initiator access to the target. Upon receipt of the affiliation close, the initiator stops sending I/O requests and the affiliation is closed when all remaining I/Os complete. The fabric affiliation method may also be used in private mode if desired.

Upon removal of an affiliation, the current affiliation owner is removed from the affiliation stack. An affiliation response frame is generated and sent to the next highest priority member of the affiliation stack with an affiliation field of 0 and the cycle is repeated.

FAST engines. FIG. 5 illustrates an exemplary FAST engine 500. In FIG. 5, the FC Receiver (Rx) frame decoder/router 502 checks received frames and dispositions them as described above. The FC Rx frame decoder/router 502 checks the frame R_CTL and Type fields to determine where to route the received frame. Routing of all frame types may be selectable via hardware registers to allow hardware generated responses, routing tunneled frames to the SATA IP core 510 or firmware processing via a SATA processor port.

If the frame is a valid SATA-encapsulated FC frame to pass on to a SATA drive, the frame is sent to the Tx FAST Link/Transport Layer block 504, where it is processed at a higher level to set up an active exchange between the host initiator and the virtual target. The Tx FAST Link/Transport Layer block 504 also de-encapsulates the FC frame and strips off and maintains the context information, and sends the SATA FISs to the SATA IP interface block 508 and a SATA IP core 510. The SATA IP interface block 508 contains any glue logic required to tie the SATA IP core 510 into the design. Among features supported is resetting targets on non-stealth LIPs, aborting the transmit requests on errors, etc. The SATA IP core 510 contains the physical and link layer logic for interfacing to SATA devices, sorts the SATA ordered sets, makes sure the spacing between frames is correct, and processes holds and hold acknowledgements and other low level SATA protocols.

The hardware response manager block 514 offloads the FAST switch's local processor by generating response frames to many FC commands. Unrecognized frames are routed through the CPU port to the local processor to be resolved. This block will respond to at least the frames listed below:

| IOC-Generated Frames | FAST Engine Response Frames |
|---|---|
| FLOGI | LS_ACC (Class 3 info only) |
| PLOGI | LS_ACC (Class 3 info only) |
| PRLI | LS_ACC (Type code is TBD) |
| Command w/o available affiliation | P_RJT/F_RJT (Port busy, reason is N_PORT busy) |
| Command not supported | P_RJT/F_RJT ( ) |

Transaction specific fields (D_ID, S_ID, OXID, etc) are read from all received frames to allow insertion in the proper fields of the response frame. A response frame request may be generated by either the FC Rx frame decoder/router 502 as a canned response to a known received frame type or by the affiliation and command queue manager block 516 to indicate busy conditions. While each FAST engine contains its own Hardware Response Block control circuitry, the data for these frames is held in a module shared by all the FAST engines to save gates. Note that only a small number of FAST engines are used to save gates. Because the router connects requests to/from SATA ports on a first-come, first-served basis, the FAST engine associated with a particular request probably will not be the port that the response is returned through. Thus, a shared context table must be maintained so all FAST engines can correctly store and/or generate the appropriate headers for the FC frames.

When a response is returned from the SATA drive, the context can be associated with the return data so that it can be routed back through the FC fabric to the initiator. In other words, the Tx FAST Link/Transport Layer block 504 opens the FC exchange structure and keeps track of the context of all frames being sent to the drives, so that when a response comes back from a drive, the Tx FAST Link/Transport Layer block 504 can put the context back into the FC frame wrapper. Tx FAST Link/Transport Layer block 504 monitors the received FC frames, and after verifying a valid Cyclic Redundancy Check (CRC) on the frame, the logic accesses the affiliation and command queue manager block 516 to determine if an affiliation already exists with the targeted SATA drive. If an affiliation exists and the frame is part of a transaction within the existing affiliation, the frame is forwarded to the disk. If the frame is not from an initiator affiliated with the disk, the frame is buffered within the FAST switch until the affiliation is closed and the disk is available to receive the command. Note that only non-queueable command FISs must be protected within the affiliation mechanism, because queueable command FISs do not require affiliations.

The logic verifies the received frame is the next frame in the sequence. If so, the frame is passed to the SATA IP interface 508 to be forwarded on to the target device, and the status of the transaction is sent to the affiliation and command queue manager block 516 to update the database. Because FAST protocol engines 500 are dynamically assigned, transaction information that spans more than one frame is passed through the affiliation and command queue manager 516 for storage in the shared database, accessible by all FAST engines. If the received FAST frame is not the next frame in the sequence, the frame is discarded.

In the case of a write, once all the data has been written to the SATA drive, the SATA drive sends a "status good" response through the SATA IP core 510 and the SATA IP interface 508 back to the Rx FAST link/transport layer 506, which retrieves the context information and sends it out through the FC Tx frame multiplexer 512 as a FC frame back to the host, indicating to the host that the write is complete. The stored FC fields are used to generate the FC frame. The module also checks and generates Cyclic Redundancy Checks (CRCs) as part of receive/retag operation. If a bad CRC is received from the disk, the CRC generator will generate a bad CRC, passing the error handling responsibility up to host.

The Tx FAST Link/Transport layer block 506 and FC Tx frame mux blocks can also detect corrupted frames and pass them to a local processor to handle as an exception, and the local processor can send frames down to the SATA as needed to do some background work.

The FC TX Mux block 518 selects between the various sources of data to send the desired data to the FAST Port interface.

Communications between mixed speed devices. FIG. 6 is a simplified illustration of an exemplary Application Specific Integrated Circuit (ASIC) 600 containing the functions of FAST switch 400 of FIG. 4. One application of the ASIC 600 is as a FC switching device capable of servicing multiple Just a Bunch Of Disks (JBODs), making them Switched Bunch Of Disks (SBODs), to boost overall performance of a system. The basic architecture is shown in FIG. 6.

Each port 602, identified individually as Port0-N, may be configured as a FC port of a particular FC speed (e.g. 1 Gbit/sec, 2 Gbit/sec, or 4 Gbit/sec) connectable to a FC loop (e.g. FC loop 604) that may contain one or more FC devices (e.g. a JBOD). The ports 602 in FIG. 6 correlate to the port link layers 408 in FIG. 4. The ports 602 may also be configured as a SATA port of a particular SATA speed (e.g. 1.5 Gbit/sec or 3 Gbit/sec), connectable to a single SATA device (e.g. SATA device 606).

It is desirable that devices on one port be able to communicate with devices on another port. In the event that two ports are running at different rates, the ASIC 600 routes traffic from an incoming port to a rate-matching memory Buffer Bank (BB) 610 before sending it to the outgoing port. Note that each BB 610 also includes some associated control logic. Shown in FIG. 6 is a router/switch core 608 and multiple BBs 610, identified individually as BB0-M. Generally, M will be less than N (where N+1 is the number of ports). Each BB 610 is capable of storing a fixed number of frames of data (e.g. four). The BBs 610 in FIG. 6 correlate to the FAST Port/ Buffers 418 in FIG. 4. The router/switch core 608 makes connections between the ports 602 and the BBs 610. The router/switch core 608 correlates to the router 422 and crossbar switch 406 in FIG. 4.

Each port 602 contains information identifying the speed of the port. Note that each port 602 is capable of supporting only one speed at a time. During initialization of the ASIC 600, each port 602 performs speed negotiation to determine the speed of the connected device, and the speed information is read from the ports and stored in the router/switch core 608 in a port speed bit vector 612.

Connections for communicating between mixed speed devices. By way of example, supposed that a FC HBA 1 operating at 4 Gbit/sec connected in a FC loop 604 to Port0 wants to send data to SATA device 606 operating at 1.5 Gbit/sec connected to Port1. In this case, FC HBA 1 arbitrates for the FC loop 604 using well-known FC protocols, and upon obtaining access to it, sends an OPN primitive to port0 (see reference character 614) in an attempt to open a connection between FC HBA 1 and the SATA device 606. Port0 then forwards the OPN to the router/switch core 608 (see reference character 616), which then extracts the source and destination addresses from the OPN primitive and determines that Port0 is the source port and Port1 is the destination port.

The router/switch core 608 then determines from the port speed bit vector 612 that a speed mismatch exists. Because a speed mismatch exists, the router/switch core 608 selects an available buffer bank 610 (assume BB0 in this example) to act as a buffer and absorb the speed mismatch. The router/switch core 608 then forwards the OPN primitive to BB0 (see reference character 618). BB0 then makes repeated attempts to send the OPN primitive to router/switch core 608. When the arbitration and fairness scheme implemented by router/switch core 608 identifies BB0 as having the highest priority, and if destination port Port1 is not busy (e.g. not involved in another connection), the router/switch core forwards the OPN primitive to Port1 (see reference character 620), and a connection between FC HBA 1 and the SATA device 606 is established.

In addition, after BB0 receives the OPN primitive 618, it may send back one or more buffer credits to Port0 (see reference character 622) through router/switch core 608, one buffer credit for each available frame in BB0. Alternatively, BB0 may wait until it receives confirmation that a connection with Port1 has been established before sending buffer credits 622 back to Port0. In either case, upon receiving the buffer credits 622, Port0 sends back one or more R_RDY primitives back to FC HBA 1 (see reference character 624), one R_RDY primitive for each buffer credit, indicating to FC HBA 1 that it may now commence with the transmission of one frame of data for every R_RDY primitive received.

At this point, FC HBA 1 transmits one or more frames 626 to SATA device 606 through Port0, router/switch core 608, BB0, and Port1, respectively. As space becomes available in BB0, BB0 sends a buffer credit 622 to Port0 through router/switch core 608. Port0 then sends an R_RDY primitive back to FC HBA 1, and an additional frame 626 is transmitted from FC HBA 1 to Port0. When all frames are indicated as having been transmitted and received by the SATA device 606, the connection is closed down by the router/switch core 608 after Port0 sends in a CLS primitive.

Premature connection closure. In the example of FIG. 7, suppose FC HBA 1 wants to send data to a 1 Gbit/sec FC device 728 connected in a FC loop to Port2. Again, the router/switch core 708 will detect a speed mismatch, and will select an available buffer bank (e.g. BB1). After a connection with Port2 is established as described above, FC HBA 1 begins transmitting frames to FC device 728.

It should be understood, however, that because the number of ports, N, is greater than M, the number of BBs 710, BBs in ASIC 700 are shared. Because of this sharing, it is inevitable that a port 702 connected to a BB 710 will, on occasion, become disconnected before completion of a data transfer due to various error or normal conditions, such as when a destination port becomes unable to accept more data.

Thus, in the example of FIG. 7, suppose that before all frames from FC HBA 1 have been received by FC device 728, the FC device closes the connection prematurely by sending a CLoSe (CLS) primitive to Port2. This closing may be the result of receiving a higher priority task or a destination port becoming unavailable, among other things. As a result of the premature connection closure, some frames remain in BB1. Further assume that FC HBA 1 sends a CLS primitive to Port0, thus closing down the connection between Port0 and BB1. The FC HBA 1 still has frames to send to Port2. Further assume that based on the priority and fairness scheme implemented by the router/switch core 708, BB1 is considered to have received its chance to connect to Port2, and has lost its priority.

Now assume that FC HBA 1 connected to Port0 wants to send data to FC device 728, and sends an OPN primitive 730 to Port0 to finish transferring its frames, which is then forwarded to the router/switch core 708 and BB0. BB0 then makes repeated attempts to send the OPN primitive to router/switch core 708. When the arbitration and fairness scheme implemented by router/switch core 708 identifies BB0 as having the highest priority, router/switch core 708 forwards the OPN primitive to Port2 (see reference character 732). Note that Port2 is no longer busy due to the premature connection disclosure described above. Further assume that BB0 now has a higher priority than BB1 according to the fairness scheme implemented by the router/switch core 708. Because Port2 is ready to accept connections, it will receive the OPN primitive from BB0, establish a connection between Port0 and Port2, and receive frames from FC HBA 1. Note that because BB1 still contains frames from FC HBA 1 that were not received by FC device 728, the FC device will receive frames that are out of order. This is the Out-Of-Order (OOO) frame problem.

Therefore, there is a need to drain any data remaining in a BB that was prematurely disconnected from a port before any other initiator can connect to it, if the reception of OOO data is to be avoided.

SUMMARY OF THE INVENTION

Embodiments of the present invention are directed to a switch connection lock and release mechanism for preventing OOO frames from being received by FC and/or SATA devices, and for supporting Native Command Queueing (NCQ) of multiple commands over a single connection to a SATA destination or target device. The connection lock and release mechanism is comprised of a set of previous AL_PA registers alpa_reg[N:0], one for each port, each of which contains a destination AL_PA and a source port number, and a bit vector prev_conn[M:0], one bit for each BB. Both the previous AL_PA registers and the bit vector are stored in and maintained by logic in a router/switch core in the switch. After initialization of the router/switch core, all previous AL_PA registers are set to store an invalid AL_PA ("invalid_alpa", an arbitrary value) and an invalid source port number ("invalid_port", an arbitrary value), and all bits in the bit vector are set to zero.

In normal operation where the destination device connected to the destination port can accept all data transferred from a particular source BB to it, the value in the previous AL_PA register for that destination port remains at "invalid_alpa" and "invalid port" values after the transfer is completed.

However, in a situation where the destination device cannot complete the full data transfer, the destination device may send a CLS primitive to prematurely tear down the connection. In this situation, the router/switch core makes note of the premature disconnection and reads a bit in the router/switch core that indicates whether data still exists in the source BB. If data still exists in the source BB, then the valid AL_PA of the destination device (or a unique fictitious AL_PA if the destination device is a SATA device), as well as the source port to which it was originally connected, are stored in the previous AL_PA register associated with the destination port. The valid AL_PA (or the unique fictitious AL_PA) stored in the previous AL_PA register indicates the last destination device to establish a connection through the destination port and that a premature disconnection has occurred. The source port number, along with the destination port device's AL_PA value, together form a two-part bit-field value that uniquely identifies a source-to-destination device premature disconnection. In addition, the particular bit of the bit vector associated with the source BB is set to one, indicating that the source BB was prematurely disconnected and may not be empty. Together, the valid AL_PA (or the unique fictitious AL_PA) stored in the previous AL_PA register, the source port number, and the bit in the bit vector set to one form a connection lock on the destination port that effectively will deny access to the destination port to all BBs with the same destination AL_PA and source port number except the source BB.

However, because the locking mechanism of embodiments of the present invention is destination and source dependent, it does not block connections with a port when the connection is for another destination or from another source port. For example, suppose that another source BB or a different source port requests a connection while the destination port is in its locked condition as described above, and the destination AL_PA of the OPN primitive from the other source BB matches the valid AL_PA stored in the previous AL_PA register. If the source port value matches but the prev_conn value is not set for the source BB, the BB will not be blocked from accessing the destination port.

Meanwhile, after the premature disconnection, the source BB will continuously request access to the destination port. When the router/switch core determines that the source BB once again has the highest priority, the request from the source BB is received at the destination port. At this point, because the valid AL_PA in the previous AL_PA register associated with the destination port matches the destination address of the request from the source BB, and the bit in the bit vector associated with the source BB is asserted, the connection is reestablished and the frames stored in the source BB can be transmitted to the destination port.

The switch may also support NCQ, which allows a SATA host to send multiple commands over a single connection to a SATA destination or target device, and allows the destination SATA device to return the requested data in an efficient order. With NCQ, SATA hosts may temporarily store commands in NCQs in a context engine before they are sent to a destination SATA device. In a switch capable of supporting NCQ, SATA traffic is handled by FAST engines and a shared context engine. An available FAST engine and the shared context engine work together to queue up commands from a SATA host connected to a source port. These commands are stored in an NCQ in the shared context engine, and are sent to a destination SATA device on a destination port, through the router/switch core. The router/switch core reserves the destination port and FAST engine/BB pair upon an NCQ request from the context engine.

Because the number of FAST engines is typically less than the number of Ports, it is important that a queued command from one SATA host destined for a SATA device reserve the destination port and FAST engine/BB pair so other SATA hosts do not get access to the destination port. To accomplish this, a locking mechanism is employed that prevents another SATA host from accessing the destination SATA device until the NCQ is emptied. The locking mechanism uses the same previous AL_PA register as for OOO frame prevention.

When the source port sends a connection request to the router/switch core, and the router/switch core determines that the destination is a SATA device on the destination port that supports NCQ, an available FAST engine/BB pair is assigned to that connection. If the destination port is available, the connection is made. After the connection is made, the command is stored in an NCQ associated with the SATA host within the shared context engine. Because the shared context engine (which stores context information for all connections) has received a queued command, the shared context engine raises a request, ncq_req, to the router/switch core to signal that there are commands pending. In response, the router/switch core stores a unique value called "fast_blking_alpa" into the previous AL_PA register associated with the destination port to lock the connection, ensuring that no other source can now connect to this destination port, and ensuring that the assigned FAST engine/BB pair remains dedicated to that connection. Note that the prev_conn bit vector is not needed to lock the connection, because with NCQs the connection is never torn down prematurely.

The router/switch core then must reserve the destination port and a FAST engine/BB pair, although it may have to wait unit it receives priority according to the router/switch core's fairness scheme. The dedicated FAST engine must thereafter drain the command stored in the dedicated NCQ to the destination SATA device before it can service another connection.

After the shared context engine sends the command to the destination SATA device, it instructs the dedicated FAST engine to send a CLS primitive to close down the connection, and causes the router/switch core to restore a value of invalid_alpa into the previous AL_PA register associated with the destination port, thereby removing the connection lock.

Until the connection lock is removed as described above, no other source port will be allowed to use the destination port. If another source port sends a connection request to the router/switch core, and the router/switch core determines that the destination is the same destination port and SATA device that is currently locked, as determined by the presence of a fast_blking_alpa in the previous AL_PA register associated with the destination port, the connection is not made.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Figure 1:
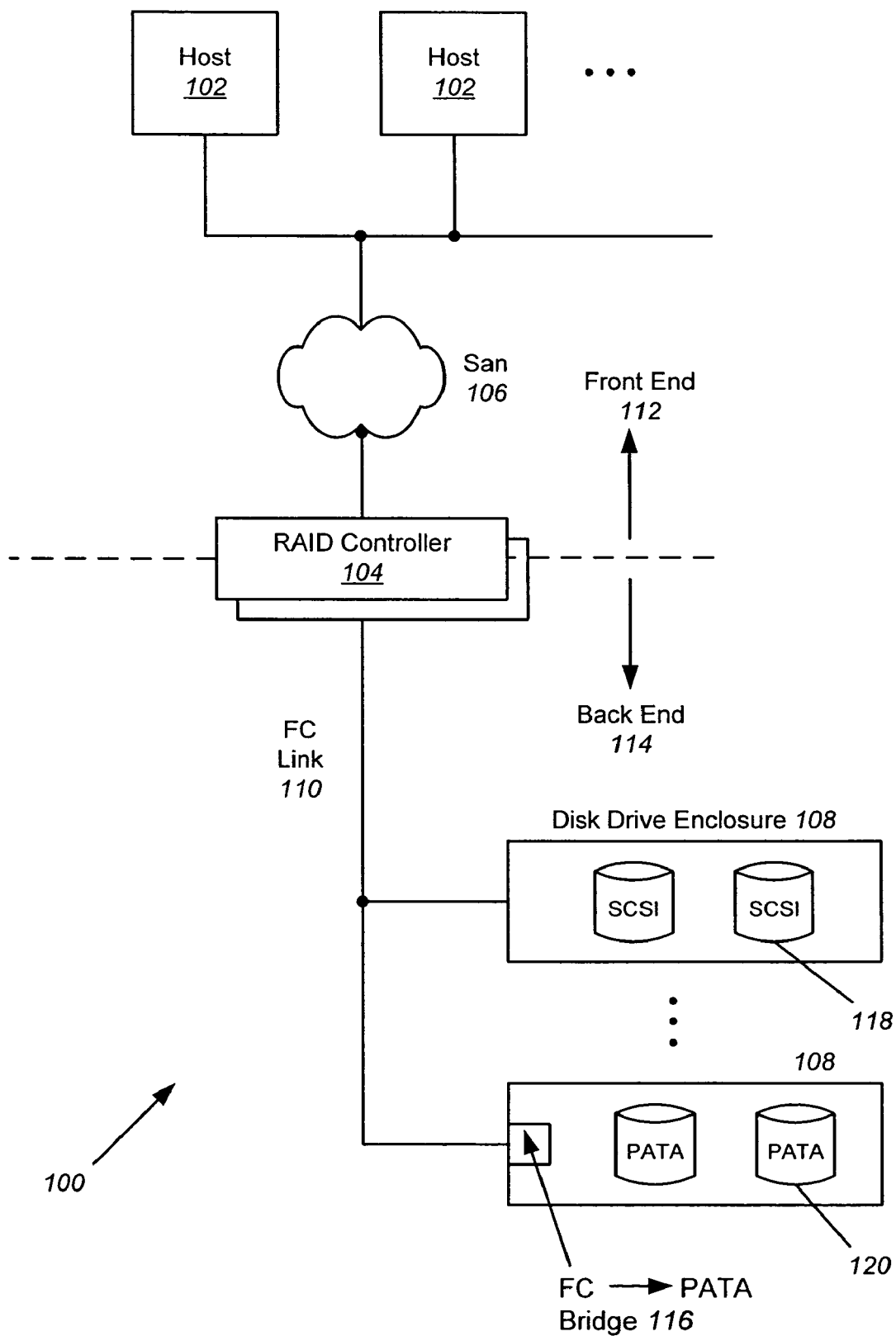
FIG. 1 is an illustration of an exemplary SAN including one or more hosts connected to two RAID controllers and two disk drive enclosures over a network, with one of the enclosures including a FC-to-PATA bridge.
Figure 2:
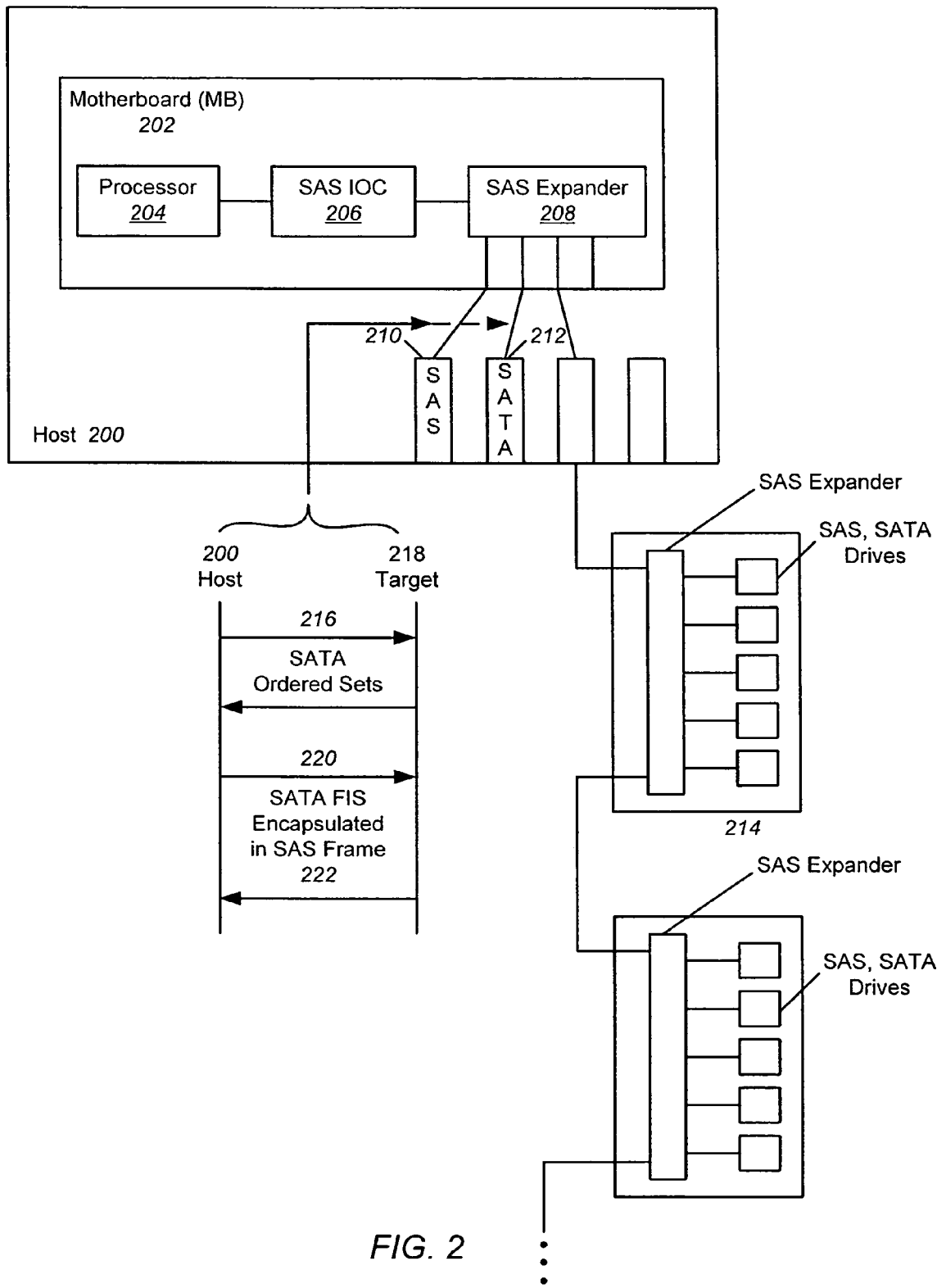
FIG. 2 is an illustration of an exemplary SAS network within a host incorporating tiered storage, where SATA drives are utilized in addition to SAS drives.
Figure 3:
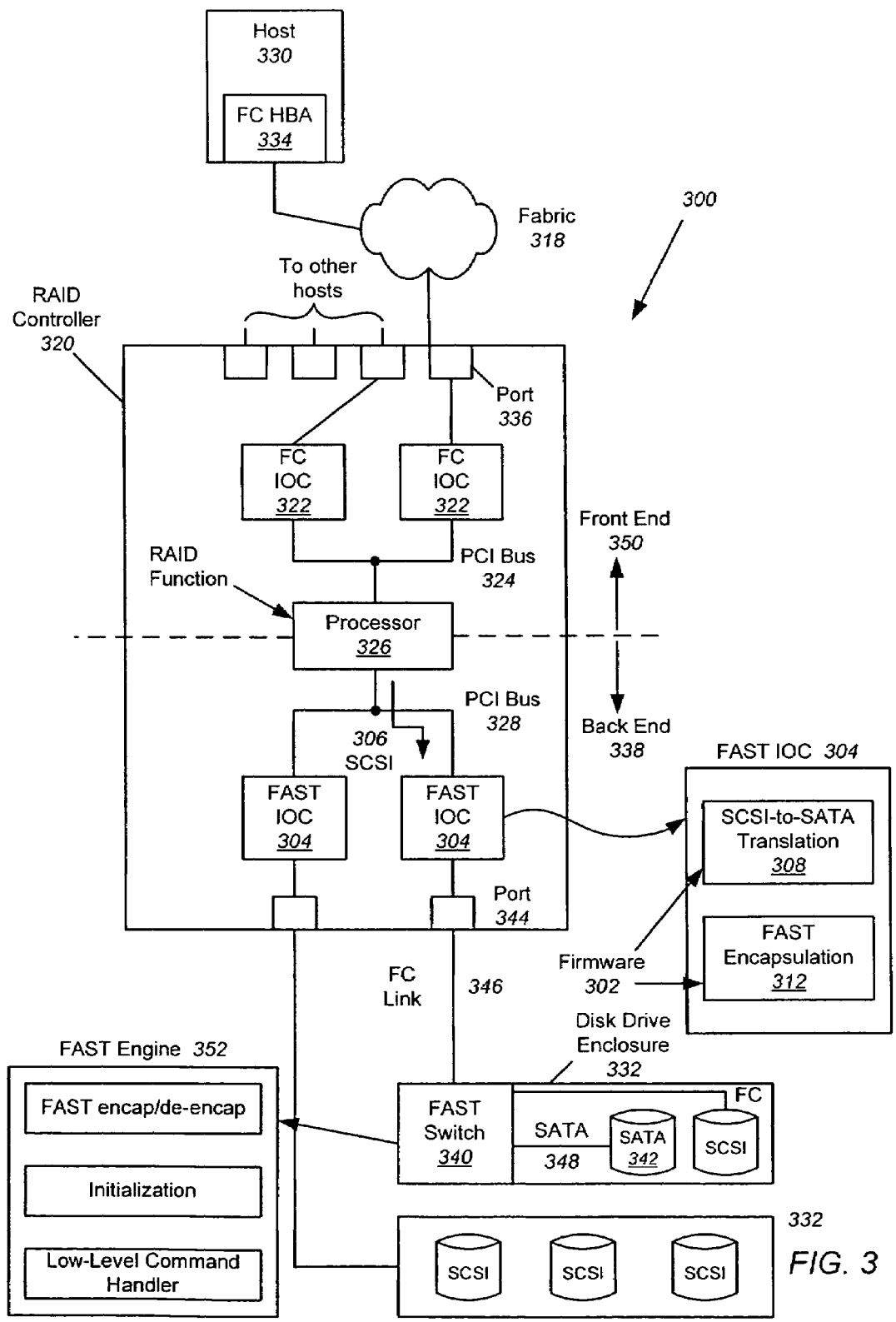
FIG. 3 is an illustration of an exemplary SAN including a host, a RAID controller including a FAST IOC, and a disk drive enclosure containing SATA drives and a FAST switch.
Figure 4:
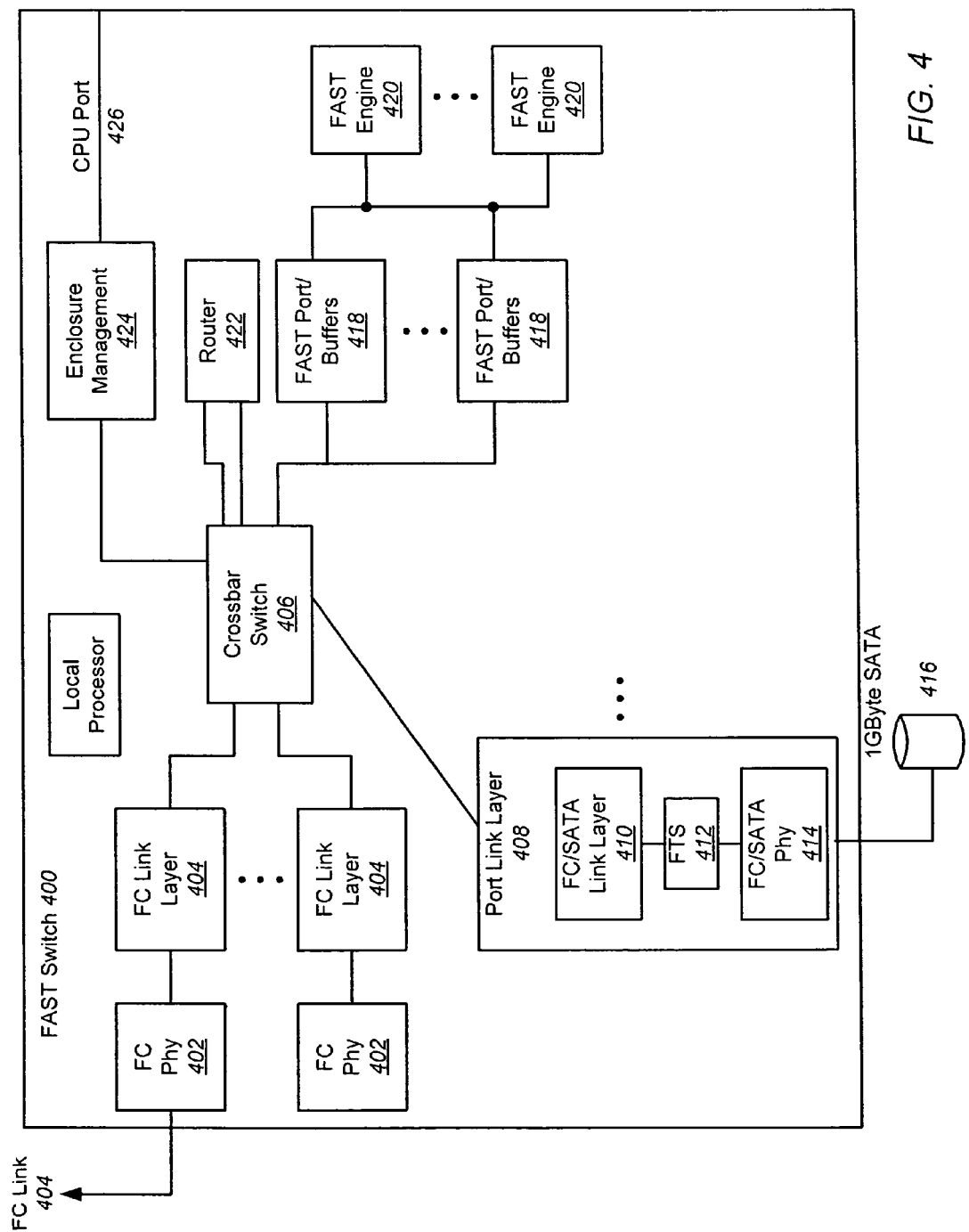
FIG. 4 is an illustration of an exemplary FAST switch that may be resident in a FAST disk drive enclosure.
Figure 5:
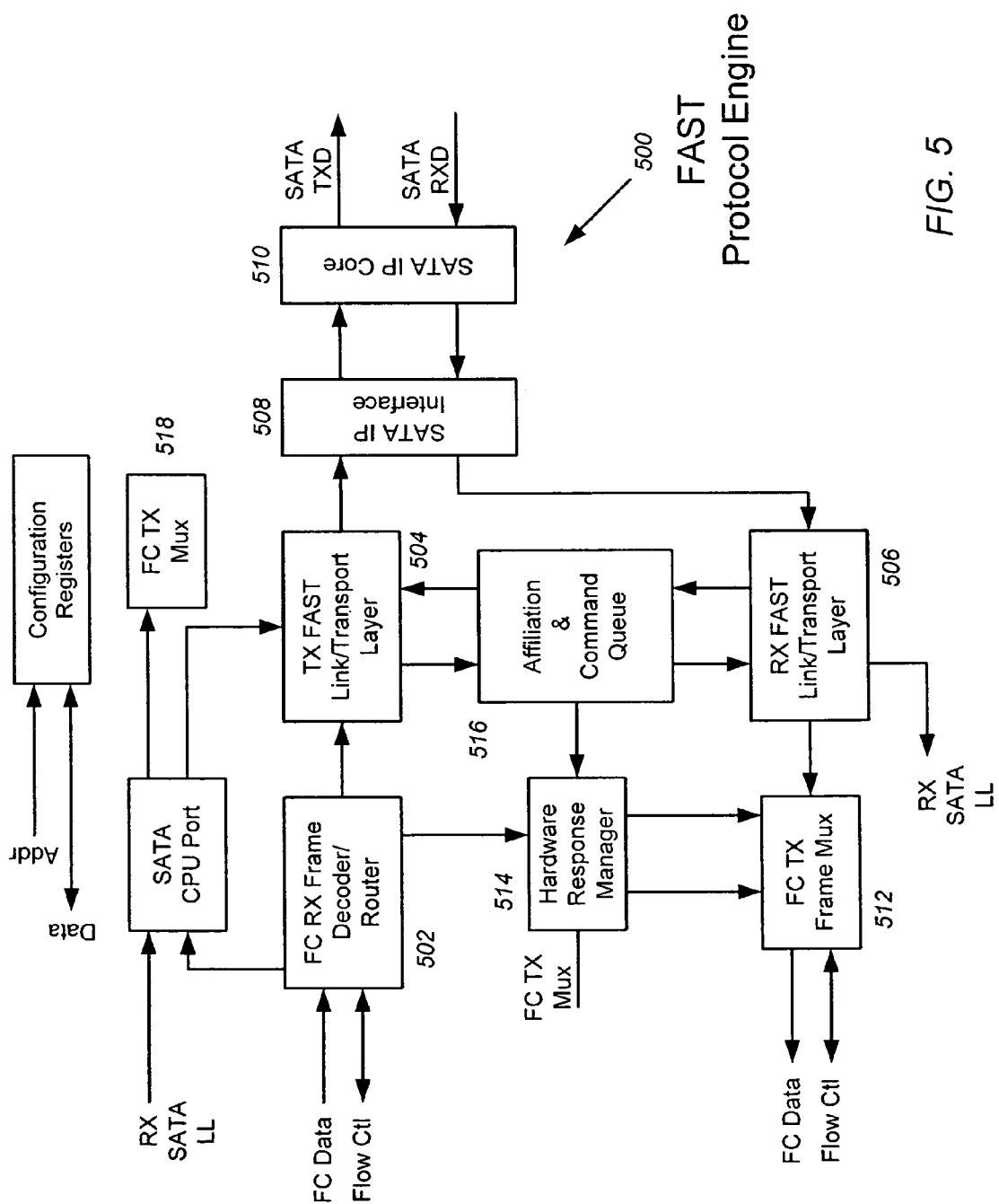
FIG. 5 is an illustration of an exemplary FAST engine.
Figure 6:
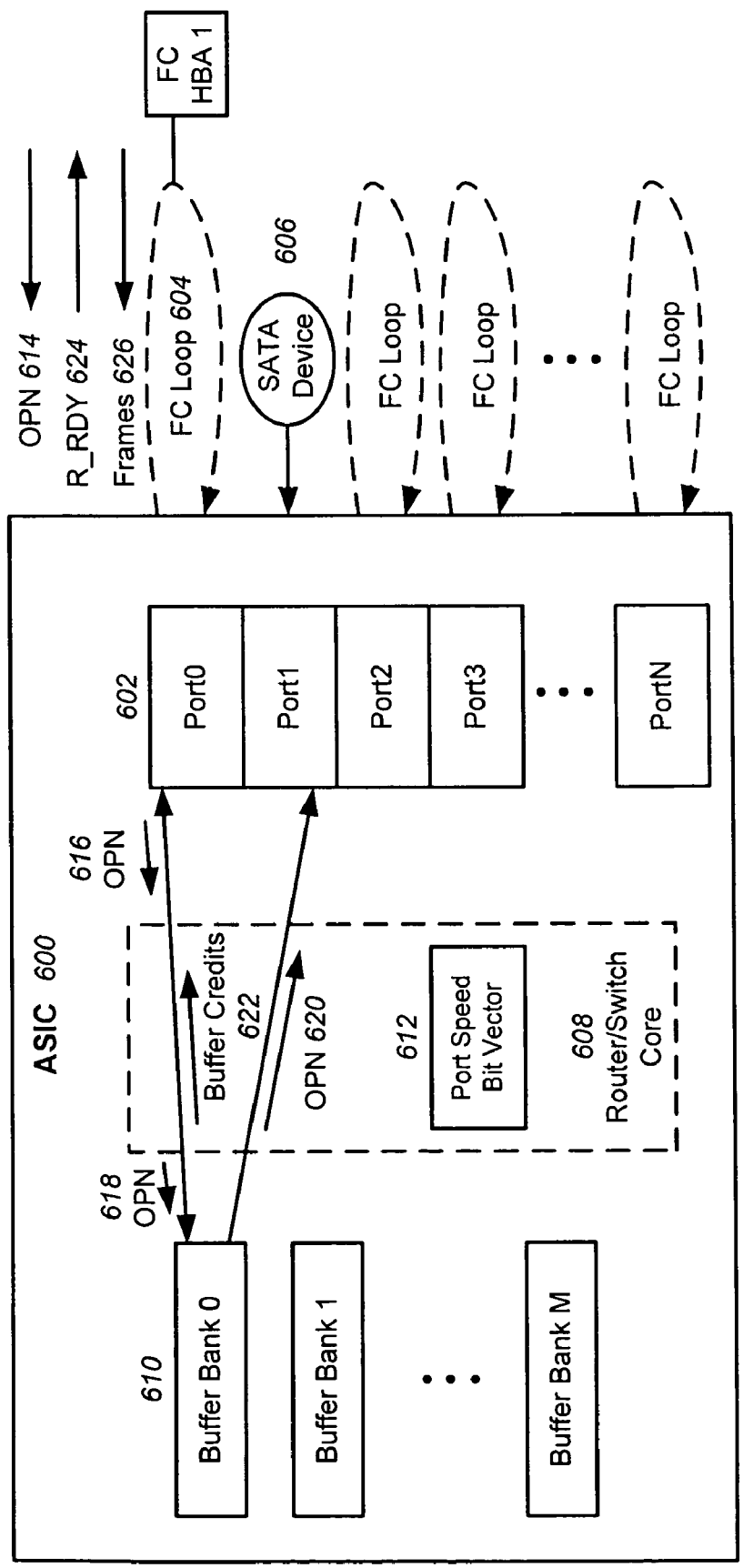
FIG. 6 is a simplified illustration of an exemplary ASIC containing the functions of FAST switch of FIG. 4, showing the establishment of a connection between speed mismatched devices.

Embodiments of the present invention utilize a connection lock and release mechanism to prevent OOO frames from being received by FC and/or SATA devices, and support Native Command Queueing (NCQ) of multiple commands over a single connection to a SATA destination or target device. Embodiments of the present invention may be located in an ASIC or other circuitry in storage enclosures or switches connected to FC devices only, SATA devices only, or a combination of FC and SATA devices in a FAST-compatible storage enclosure. These storage enclosures or switches may be part of a FAST-compatible SAN as shown in FIG. 3, but may also be part of conventional SANs supporting only FC or SATA devices. Embodiments of the present invention are also applicable to SAS-SATA SANs as described above.

Figure 8:
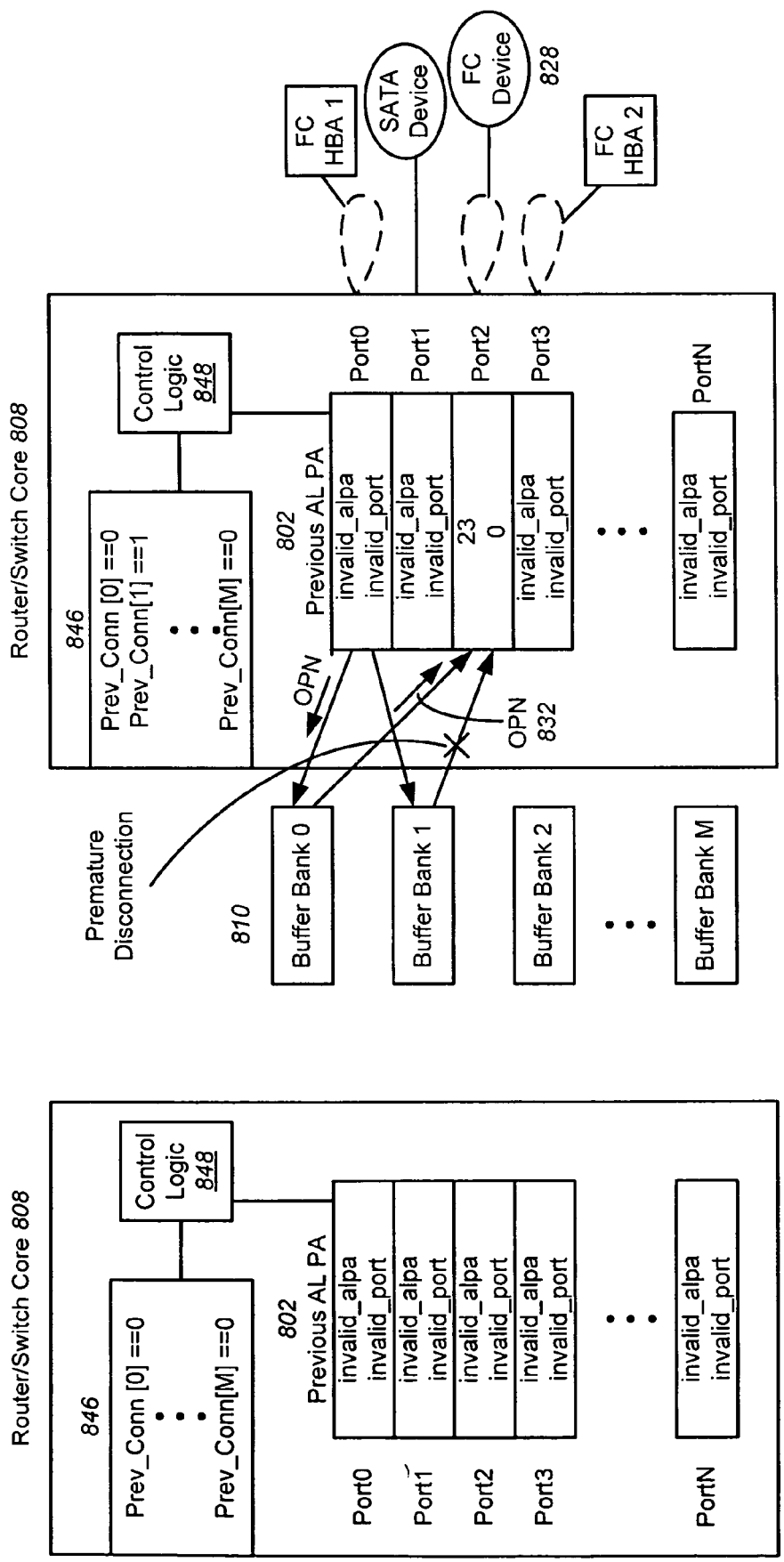
FIG. 8A is an illustration of an exemplary lock-release mechanism comprised of a set of previous AL_PA registers alpa_reg[N:0], one for each port, and a bit vector prev_conn [M:0], one bit for each BB, according to embodiments of the present invention.
FIG. 8B is an illustration of an exemplary locked condition that prevents another initiator from accessing the same target or destination device according to embodiments of the present invention.

Connection locks. Embodiments of the present invention prevent a target or destination from receiving OOO frames by employing two main connection lock and release constructs illustrated in the example of FIG. 8A. The connection lock and release mechanism of FIG. 8A is comprised of a set of previous AL_PA registers 802, which contains the destination AL_PA and source port number alpa_reg[N:0], one for each port, and a bit vector 846, prev_conn[M:0], one bit for each BB. In one embodiment, the previous AL_PA registers 802 may be sixteen bits wide, eight bits for the source port number and eight bits for the destination AL_PA. Both the previous AL_PA registers 802 and the bit vector 846 are stored in the router/switch core 808, and are coupled to and maintained by control logic 848 within the router/switch core, which may be comprised of conventional elements such as gates, flip-flops, registers, and the like. After initialization of the router/switch core 808, as shown in FIG. 8A, all previous AL_PA registers 802 are set to store an invalid AL_PA ("invalid_alpa"), an invalid source port number ("invalid_source") and all bits in the bit vector 846 are set to zero.

When a port is connected as a destination port and the source is a BB, two general situations can occur. In normal operation where the destination device connected to the destination port can accept all data transferred from the BB to it, the value in the previous AL_PA register for that destination port remains at "invalid_alpa" and "invalid_source" after the transfer is completed. In other words, if a connection allows for all frames of data to be transmitted before closing, then no changes are made to either the previous AL_PA registers or the bit vector.

However, in a situation where the destination device cannot complete the full data transfer, the destination device may send a CLS primitive to prematurely tear down the connection. In this situation, the control logic in the router/switch core detects the CLS primitive and the premature disconnection, and reads a bit in the router/switch core that indicates for each BB whether data still exists in that BB. If data still exists in a particular BB, then the AL_PA of the destination device and the port number of the source device are stored in the previous AL_PA register associated with the destination port, and a logic one is stored in the bit in the bit vector associated with the BB.

Figure 7:
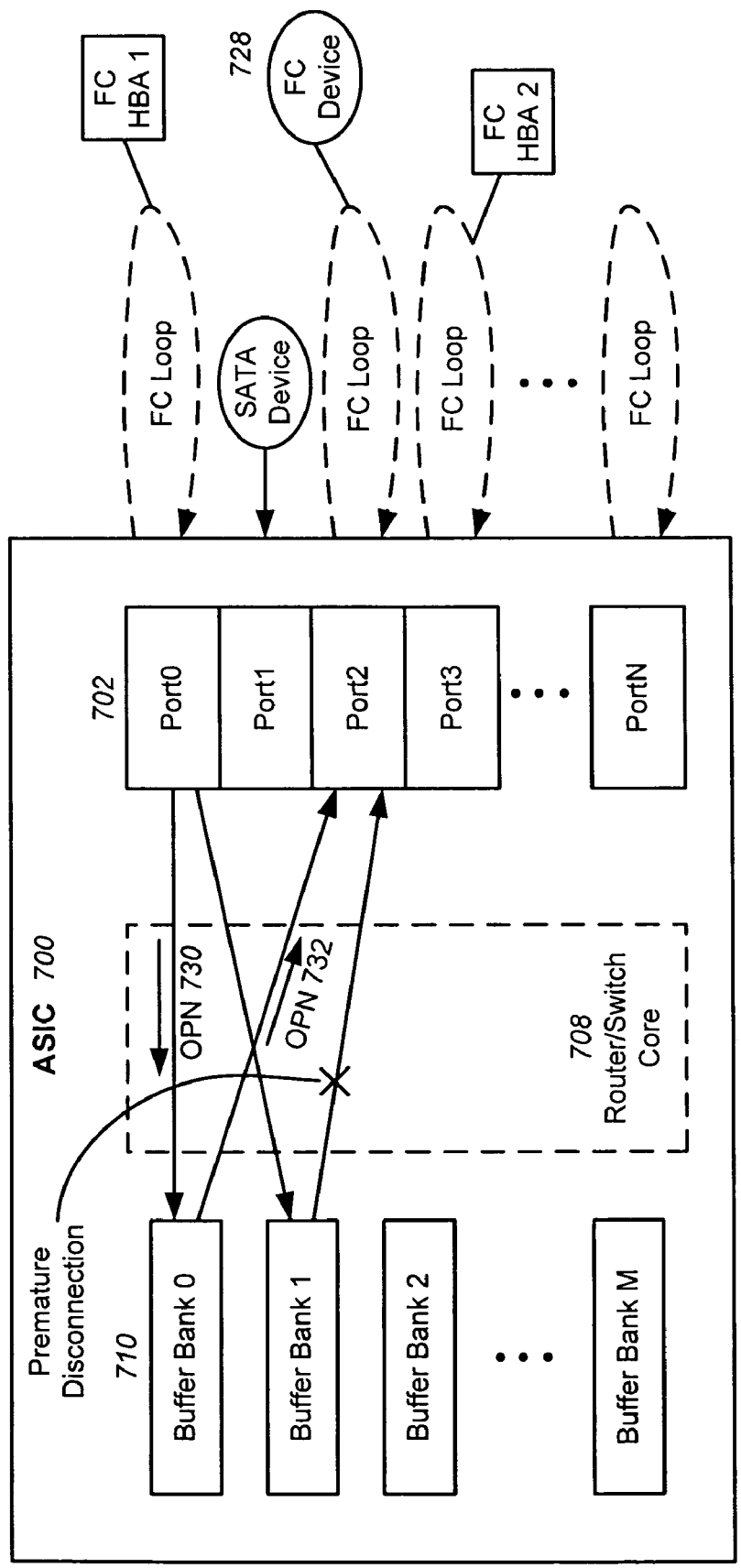
FIG. 7 is a simplified illustration of an exemplary ASIC containing the functions of FAST switch of FIG. 4, showing the OOO frame problem.

In the example of FIG. 8B, which illustrates how the OOO problem in the example of FIG. 7 is solved utilizing embodiments of the present invention, an AL_PA of 23 and the source port number of 0 is stored in the previous AL_PA register 802 for Port2, indicating that target FC device 828 with an AL_PA of 23 was the last FC device to establish a connection through Port2 and that a premature disconnection has occurred. In addition, prev_conn[1] of the bit vector is set to one or asserted, indicating that BB1 was prematurely disconnected and may not be empty. The valid AL_PA of 23, the valid source port number of 0 stored in the previous AL_PA register associated with Port2, and the prev_conn[1] set to one comprise the individual components of a connection lock on Port2 that effectively will deny access to Port2 to all BBs with destination ALPA 23 and source port number of 0, with the exception of BB1.

For example, as illustrated in FIG. 8B, if a subsequent OPN primitive (see reference character 832) from FC HBA 1 is received at Port0 from BB0 and is destined for FC device 828, the OPN primitive will be rejected by the control logic 848 in the router/switch core 808 and the connection will not be allowed because although a valid AL_PA of 23 matching the destination AL_PA of the OPN primitive 832 exists and the source port number of 0 matches the source port in the previous AL_PA register associated with Port2, the bit vector for BB2 was not asserted, indicating that BB2 was not the BB previously involved with the premature disconnection. In general, all requests for Port2 with a destination ALPA of 23 and source port number of 0 will be blocked except for the original disconnected source (BB1 in the example of FIG. 8B).

Figure 9:
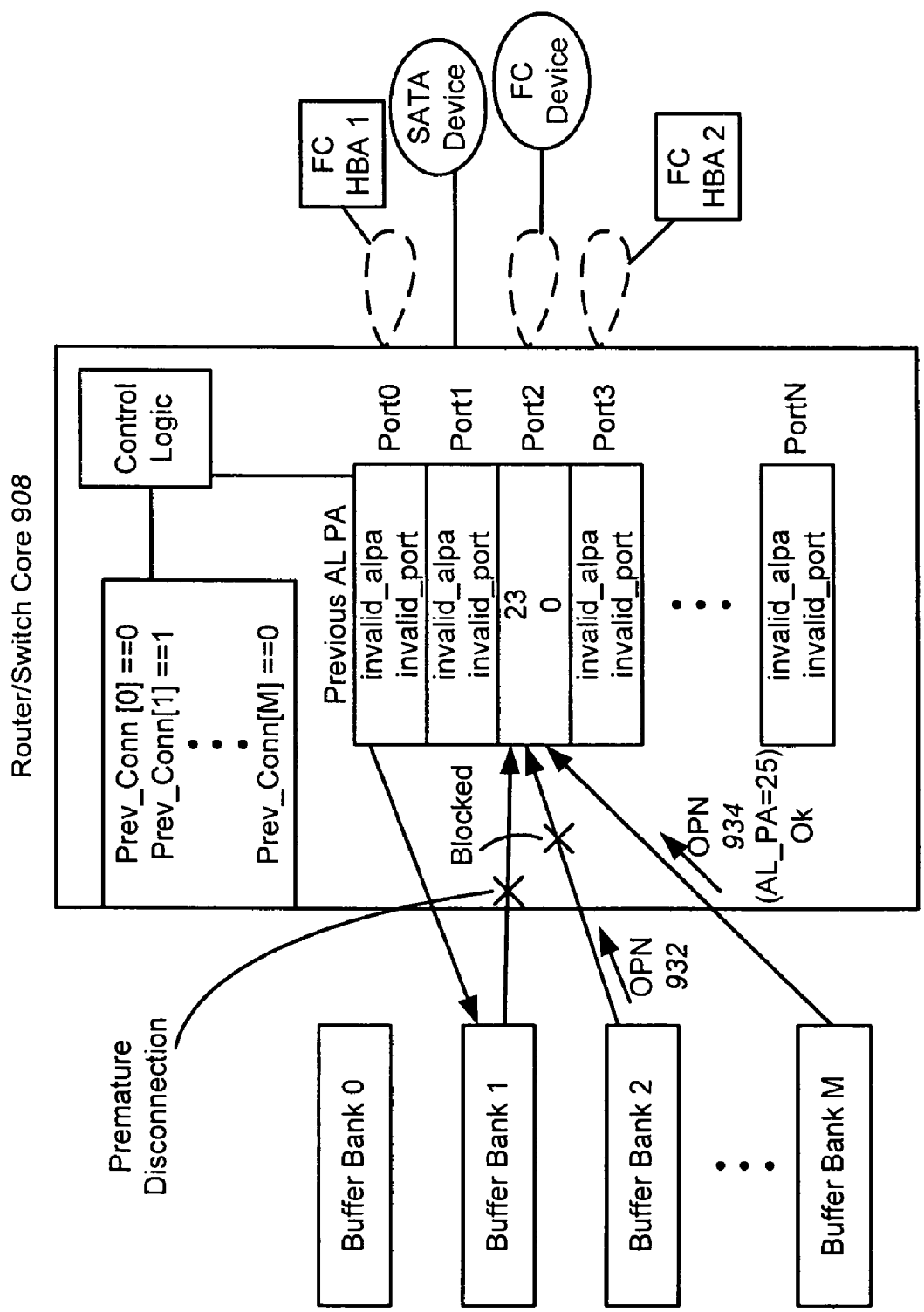
FIG. 9 is an illustration of how the locking mechanism of embodiments of the present invention is destination dependent, and do not block connections with a port when the connection is for another destination on that port.

FIG. 9 illustrates how the locking mechanism of embodiments of the present invention is destination dependent, and does not block connections with a port when the connection is for another destination. In the example of FIG. 9, BBM requests a connection with Port2 while Port2 is in its locked condition. If BBM should receive the highest priority according to fairness/priority scheme of the router/switch core 908, the OPN primitive 934 is forwarded to Port2. However, in the example of FIG. 9, the destination AL_PA of the OPN 934 (25) does not match with the valid AL_PA stored in the previous AL_PA register associated with Port2 (23). In this case, the connection between BBM and Port2 is allowed. It should be understood that the locking mechanism of embodiments of the present invention provides fairness and does not penalize and deprive source BBs and ports of their priority order. A table summarizing all possible states of the connection lock and the outcome is provided below.

| Connection Lock Table | | | |
|---|---|---|---|
| destination AL_PA | source port number | source BB bit | block? |
| no match | no match | not set | no |
| no match | no match | set | no |
| no match | match | not set | no |
| no match | match | set | no |
| match | no match | not set | no |

-continued

Connection Lock Table

| destination AL_PA | source port number | source BB bit | block? |
|---|---|---|---|
| match | no match | set | no |
| match | match | not set | yes |
| match | match | set | no |

The connection lock table above illustrates that any of the individual components of the connection lock for a particular destination port—the stored destination AL_PA, source port number, and the source BB bit—may alone be sufficient to lock the connection. For example, any time an OPN primitive for a different destination (i.e. destination AL_PA=no match) is received by a locked destination port, the request will not be blocked, regardless of the other components of the connection lock. Similarly, any time an OPN primitive from a different source port (i.e. source port number=no match) is received by a locked destination port, the request will not be blocked, regardless of the other components of the connection lock. Finally, any time an OPN primitive from a different source BB (i.e. source BB bit=not set) is received by a locked destination port, the request will not be blocked, regardless of the other components of the connection lock.

Meanwhile, after the premature disconnection between BB1 and Port2, BB1, because it still contains untransmitted frames, will continuously request access to Port2 using an internal signal similar to an OPN primitive. However, only when the router/switch core 808 determines that BB1 now has the highest priority will this internal signal from BB1 be received at Port2. At this point, because the valid AL_PA of 23 and the source port number of 0 in the previous AL_PA register associated with Port2 matches the destination address of the internal signal from BB1 and the source port number, and because prev_conn[1]=1, the connection between Port0 and Port2 can be reestablished and the frames stored in BB1 can be transmitted to Port2.

In one embodiment of the present invention, whenever the router/switch core 908 sees a request from a BB with its corresponding prev_conn bit asserted, the router/switch core interrupts its normal priority scheme and immediately grants access to that BB. This access is proper because there will be a ready and willing destination device with an AL_PA of 23 on Port2 that has been waiting to finish off the previously interrupted data transfer. When the connection completes, the previous AL_PA register for Port2 is reset to an invalid_alpa value along with an invalid port number value and the prev_conn bit corresponding to BB1 is deasserted, completing the release process.

Although the previous paragraphs have described a single instance of a connection lock, it should be understood that multiple connection locks may exist simultaneously. In addition, although the previous paragraphs have described the locking mechanism with respect to a FC target device, embodiments of the present invention are applicable to both FC and SATA targets. In the case of a SATA target, a unique fictitious AL_PA is used as the destination address in OPN primitives requesting a data transfer with the SATA target, and this unique fictitious AL_PA is stored in the previous AL_PA register when the connection is torn down prematurely. All other functionality remains the same.

Support of NCQ. FAST-compatible systems as described above may support NCQ (Native Command Queuing) available in the SATA II specification (Serial ATA International Organization, Serial ATA Revision 2.5, 27 Oct. 2005), the contents of which are incorporated herein by reference. Embodiments of the present invention may also support NCQ, which allows a SATA host to send multiple commands over a single connection to a destination SATA device, and allows the destination SATA device to return the requested data in any order, but preferably in an order that requires the least amount of movement by the disk drive read head (if the destination SATA device is a disk drive). This improves performance by optimizing the amount of movement required for the relatively slow mechanical part, the read head. With NCQ, SATA hosts may temporarily store commands in NCQs in a context engine before they are sent to a destination SATA device.

Figure 10:
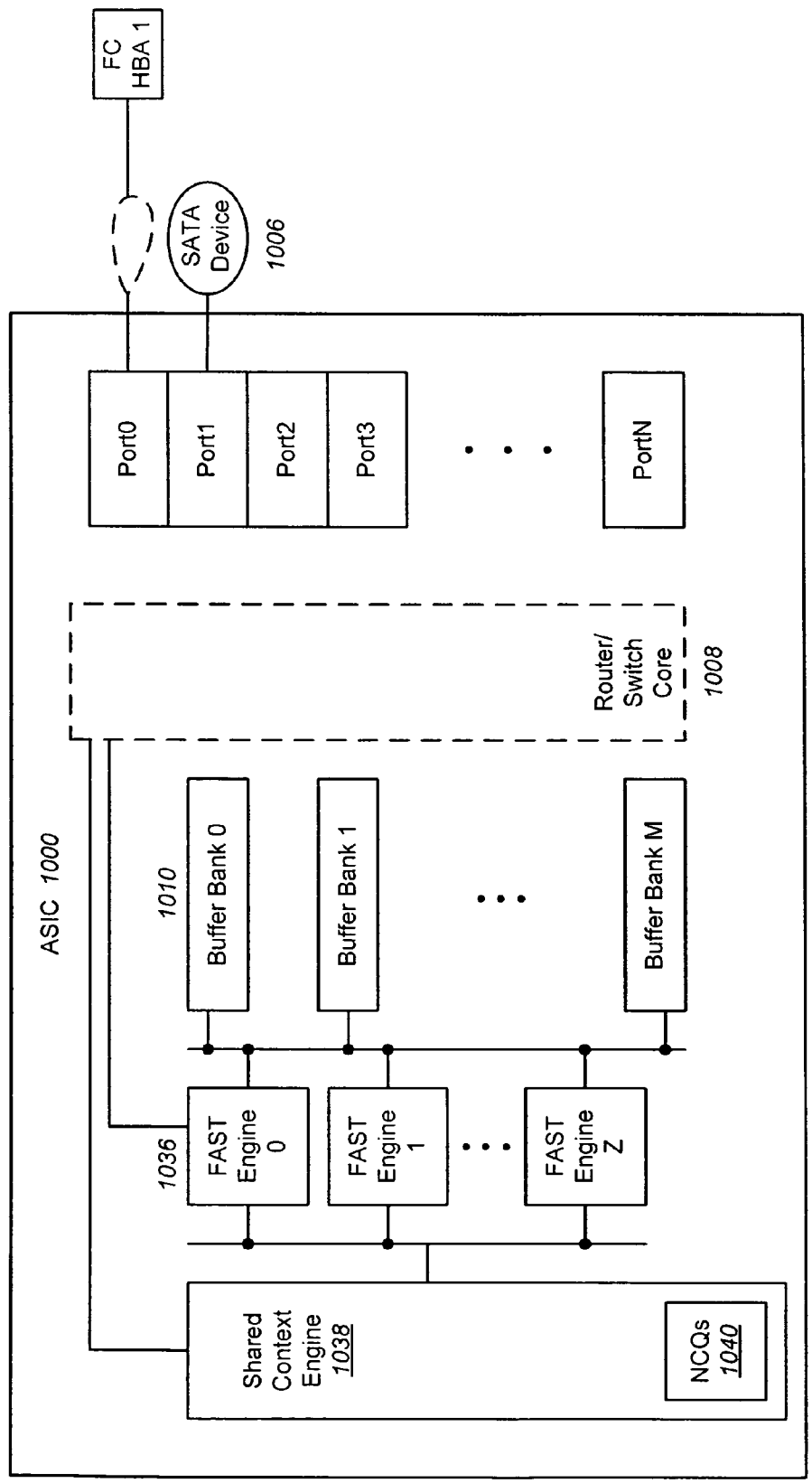
FIG. 10 is an illustration of an exemplary FAST-compatible capable of supporting NCQ according to embodiments of the present invention.

FIG. 10 is an illustration of an exemplary FAST-compatible ASIC 1000 capable of supporting NCQ according to embodiments of the present invention. In the example of FIG. 10, SATA traffic is handled by FAST engines 1036 and a shared context engine 1038. An available FAST engine 1036 and the shared context engine 1038 work together to queue up commands from a SATA host connected to a source port (e.g. SATA HBA 1 on Port0) in NCQs 1040 in shared context engine 1038, and send them to a SATA destination on a destination port (e.g. SATA device 1006 on Port1), through router/switch core 1008. In FIG. 10, the BBs 1010 are storage units (RAMs) that enable an associated FAST Engine to perform NCQ-related tasks. The router/switch core 1008 instructs the shared context engine 1038 and the available FAST engine 1036 to send queued commands from the NCQ to the destination port in the correct order. Because the number of FAST engines, Z+1, is less than the number of Ports, N+1, it is important that queued commands from one SATA host destined for a SATA device reserve the destination port and FAST engine/BB pair so other SATA hosts do not get access to the destination port. Otherwise, SATA commands may get starved as they are unable to get access to the FAST engine/BB pair and destination port at the same time.

Figure 11:
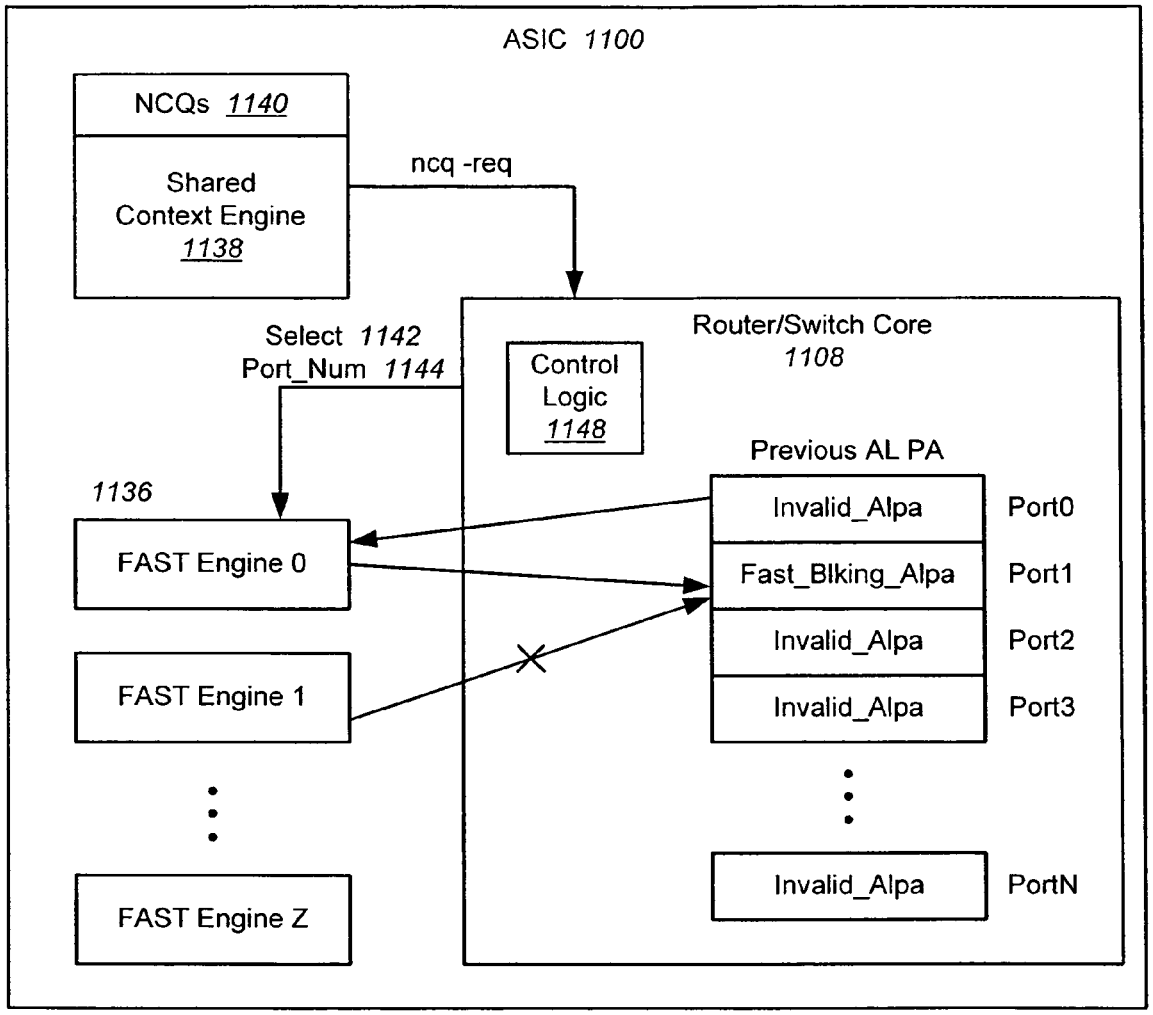
FIG. 11 is an illustration of an exemplary FAST-compatible ASIC supporting NCQ in a locked condition that prevents another initiator from accessing the same target or destination device according to embodiments of the present invention.

FIG. 11 is an illustration of an exemplary FAST-compatible ASIC 1100 supporting NCQ and a locking mechanism that prevents another SATA host from accessing the same destination SATA device according to embodiments of the present invention. Note that FIG. 11 is a simplified illustration of FIG. 10, showing only the router/switch core 1108, FAST engines 1136 and shared context engine 1138 and eliminating the BBs and ports to simplify understanding. As can be seen in FIG. 11, the locking mechanism uses the same previous AL_PA register (alpa_reg[N:0]) as for OOO frame prevention, described above except the source port number in the AL_PA register is not needed.

In the example of FIG. 11, when Port0 sends a connection request to the router/switch core 1108, and the router/switch core determines that the destination is a SATA device on Port1 that supports NCQ, an available FAST engine/BB pair is assigned to that connection (e.g. FAST engine 0 in the example of FIG. 11). Port0 will then send a command to the FAST engine which is stored in an NCQ associated with the SATA host within the shared context engine. If Port1 is available, as determined by the presence of an invalid_alpa in the previous AL_PA register associated with Port1, the connection is made. Because the shared context engine 1138 (which stores context information for all connections) has received a queued command, the shared context engine raises a request, ncq_req, to the router/switch core 1108 to signal that there is a command pending in the context engine. In response, the router/switch core 1108 puts a unique value called "fast_blking_alpa" into the previous AL_PA register associated with Port1 to lock the connection and ensure that the FAST engine 0/BB0 pair remains dedicated to that connection. Note that the prev_conn bit vector is not needed to lock the connection, because with NCQs the connection is never torn down prematurely. The source port number in the previous AL_PA register is not needed to lock the connection because with NCQs all source ports will be blocked.

The router/switch core then must reserve port1 and FAST engine 0, although it may have to wait unit it receives priority according to the router/switch core's fairness scheme. FAST engine 0 must thereafter drain the command stored in the dedicated NCQ to the destination SATA device before it can service another connection.

After the shared context engine 1138 sends the command to the destination SATA device, it instructs FAST engine 0 to send a request to close down the connection, and causes the router/switch core 1108 to store an invalid_alpa into the previous AL_PA register associated with Port1, thereby removing the connection lock.

Until the connection lock is removed as described above, no other port will be allowed to use Port1. In the example of FIG. 11, if another port sends a connection request to the router/switch core 1108, and the router/switch core determines that the destination is a SATA device on Port1 that supports NCQ, an available FAST engine/BB pair is assigned to that connection (e.g. FAST engine 1 in the example of FIG. 11). However, as long as Port1 is unavailable, as determined by the presence of a fast_blking_alpa in the previous AL_PA register associated with Port1, the connection is not made.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system including a plurality of ports, the system for establishing a connection and enabling communications between a source and a destination device coupled to a destination port, a connection lock circuit for preventing Out-Of-Order (OOO) frames from being received by the destination device, the connection lock circuit comprising:
a plurality of previous Arbitrated Loop Physical Address (AL_PA) registers, each previous AL_PA register associated with a different destination port for storing a valid AL_PA of a destination device coupled to that destination port when that destination port was participating in a connection; and
control logic coupled to the previous AL_PA registers and configured for utilizing the previous AL_PA register associated with the destination port that was participating in the connection in determining whether a subsequent connection request received at the destination port should be blocked.

2. The connection lock circuit as recited in claim 1, further comprising:
each previous AL_PA register for storing a source port number of a source port that was participating in the connection; and
the control logic further configured for additionally utilizing the source port number stored in the previous AL_PA register associated with the destination port that was participating in the connection in determining whether a subsequent connection request received at the destination port should be blocked after the connection between the source and the destination device is prematurely closed.

3. The connection lock circuit as recited in claim 1, wherein when the destination device is a Serial Advanced Technology Attachment (SATA) device, the control logic is further configured for storing a unique fictitious AL_PA in the previous AL_PA register associated with the destination port to which the SATA device is connected.

4. A Fiber Channel Attached SATA Tunneling (FAST) switch comprising the connection lock circuit recited in claim 1.

5. The connection lock circuit as recited in claim 1, further comprising:
a plurality of Fiber Channel Attached SATA Tunneling (FAST) engines coupled to the control logic; and
a shared context engine coupled to the plurality of FAST engines and the control logic, the shared context engine including a plurality of Native Command Queues (NCQs), each NCQ associated with a particular source;
wherein when the shared context engine is informed that the destination device is a SATA device that supports native command queuing and is available, the shared context engine stores a fast_blking_alpha as the valid AL_PA in the previous AL_PA register associated with the destination port to lock the connection.

6. The connection lock circuit as recited in claim 2, further comprising:
a plurality of Buffer Banks (BBs) coupled to the control logic for assisting in enabling communications between the source and the destination device;
a bit vector coupled to the control logic, each bit in the bit vector associated with a different BB for storing an indication of whether that BB was participating in the connection that was prematurely closed; and
the control logic further configured for additionally utilizing the bit vector associated with the destination port that was participating in the connection in determining whether the subsequent connection request should be blocked after the connection between the source and the destination device is prematurely closed.

7. The connection lock circuit as recited in claim 2, the control logic further configured for detecting the premature closing of the connection by detecting a CLoSe (CLS) primitive sent from the destination device.

8. The connection lock circuit as recited in claim 3, the control logic further configured for blocking the connection request upon determining that a destination address of the connection request does not match the unique fictitious AL_PA associated with the destination port that was participating in the connection.

9. A Switched Bunch Of Disks (SBOD) comprising the FAST switch recited in claim 4.

10. The connection lock circuit as recited in claim 5, the control logic further configured for:
determining whether the destination device is a SATA device that supports native command queuing, and if it is determined that the destination device is a SATA device that supports native command queuing,
assigning an available FAST engine to the connection, and
determining whether the destination port coupled to the destination device is available, and if it is available, informing the shared context engine that the destination device is a SATA device that supports native command queuing and is available.

11. A Fibre Channel Attached SATA Tunneling (FAST) switch comprising the connection lock circuit recited in claim 5.

12. The connection lock circuit as recited in claim 3, the control logic further configured for:
blocking the connection request upon determining that a destination address and the source port of the connection request match the valid AL_PA and the source port number associated with the destination port that was participating in the connection, and the bit vector associated with the BB of the connection request is not set; and
allowing all other connection requests.

13. The connection lock circuit as recited in claim 6, the control logic further configured for bypassing a normal priority scheme and immediately allowing the BB that participated in the connection to re-connect to the destination device.

14. The connection lock circuit as recited in claim 6, wherein each previous AL_PA register is initialized to store an invalid_alpha value and an invalid source port number, and each bit in the bit vector is initialized to store an unasserted value.

15. The connection lock circuit as recited in claim 10, wherein the control logic is further configured for storing commands from the source in the NCQ associated with the source after the connection has been locked.

16. A Switched Bunch Of Disks (SBOD) comprising the FAST switch recited in claim 11.

17. A Storage Area Network (SAN) comprising the SBOD recited in claim 9.

18. The connection lock circuit as recited in claim 15, wherein the assigned FAST engine fetches a next queued command from the NCQ associated with the source, and requests access to the destination device.

19. A Storage Area Network (SAN) comprising the SBOD recited in claim 16.

20. The connection lock circuit as recited in claim 18, wherein when the shared context engine determines that all commands have been sent to the destination device and all data from the destination device has been sent to the source, the shared context engine instructs the assigned FAST engine to close down the connection and store an invalid_alpha into the previous AL_PA register associated with the destination port.

21. In a system including a plurality of ports, the system for establishing a connection and enabling communications between a source and a destination device coupled to a destination port, a method for preventing Out-Of-Order (OOO) frames from being received by the destination device, the method comprising:
storing a valid AL_PA of a destination device coupled to a destination port when that destination port was participating in the connection; and
utilizing the stored valid AL_PA associated with the destination port that was participating in the connection in determining whether a subsequent connection request received at the destination port should be blocked.

22. The method as recited in claim 21, further comprising:
storing a source port number of a source port that was participating in the connection; and
additionally utilizing the stored source port number associated with the destination port that was participating in the connection in determining whether a subsequent connection request received at the destination port should be blocked after the connection between the source and the destination device is prematurely closed.

23. The method as recited in claim 21, further comprising: when the destination device is a Serial Advanced Technology Attachment (SATA) device, storing a unique fictitious AL_PA associated with the destination port to which the SATA device is connected.

24. The method as recited in claim 21, further comprising:
upon determining that the destination device is a SATA device that supports native command queuing and is available; storing a fast_blking_alpha as the valid AL_PA associated with the destination port to lock the connection.

25. The method as recited in claim 22, further comprising:
maintaining a plurality of Buffer Banks (BBs) for assisting in enabling communications between the source and the destination device;
maintaining a bit vector, each bit in the bit vector associated with a different BB for storing an indication of whether that BB was participating in the connection that was prematurely closed; and
additionally utilizing the bit vector associated with the destination port that was participating in the connection in determining whether the subsequent connection request should be blocked after the connection between the source and the destination device is prematurely closed.

26. The method as recited in claim 25, further comprising:
blocking the connection request upon determining that a destination address and the source port of the connection request match the valid AL_PA and the source port number associated with the destination port that was participating in the connection, and the bit vector associated with the BB of the connection request is not set; and
allowing all other connection requests.

27. The method as recited in claim 25, further comprising bypassing a normal priority scheme and immediately allowing the BB that participated in the connection to re-connect to the destination device.

28. The method as recited in claim 25, further comprising initially associating a invalid_alpha value and an invalid source port number with each destination port, and initializing each bit in the bit vector to an unasserted value.

29. The method as recited in claim 25, further comprising detecting the premature closing of the connection by detecting a CLoSe (CLS) primitive sent from the destination device.

30. The method as recited in claim 23, further comprising blocking the connection request upon determining that a destination address of the connection request does not match the unique fictitious AL_PA associated with the destination port that was participating in the connection.

31. The method as recited in claim 24, further comprising:
determining whether the destination device is a SATA device that supports native command queuing, and if it is determined that the destination device is a SATA device that supports native command queuing,
assigning an available Fibre Channel Attached SATA Tunneling (FAST) engine to the connection, and
determining whether the destination port coupled to the destination device is available, and if it is available, informing the shared context engine that the destination device is a SATA device that supports native command queuing and is available.

32. The method as recited in claim 31, further comprising storing commands from the source in a Native Command Queue (NCQ) associated with the source after the connection has been locked.

33. The method as recited in claim 32, further comprising using the assigned FAST engine to fetch a next queued command from the NCQ associated with the source and request access to the destination device.

34. The method as recited in claim 33, further comprising when the shared context engine determines that all commands have been sent to the destination device and all data from the destination device has been sent to the source, the shared context engine instructs the assigned FAST engine to close down the connection and store an invalid_alpha into the previous AL_PA register associated with the destination port.

* * * * *